(12) United States Patent
Ochs (10) Patent No.: US 6,370,886 B1
(45) Date of Patent: Apr. 16, 2002

(54) APPARATUS FOR FREEZING AND CUTTING LIQUIDS

(75) Inventor: Gregory L. Ochs, Kirkland, WA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/490,583

(22) Filed: Jan. 25, 2000

(51) Int. Cl.[7] .............................................. F25D 13/06
(52) U.S. Cl. ............................ 62/63; 62/320; 62/345; 198/823
(58) Field of Search ..................... 62/66, 328, 345, 62/380, 63; 198/823

(56) References Cited

U.S. PATENT DOCUMENTS

| | | |
|---|---|---|
| 680,051 A | 8/1901 | Lueteke |
| 1,575,274 A | 3/1926 | Passarelli |
| 1,615,198 A | 1/1927 | Blendow et al. |
| 1,810,863 A | 6/1931 | Vogt |
| 1,810,864 A | 6/1931 | Vogt |
| 2,282,525 A | 5/1942 | Maguire |
| 2,397,446 A | 3/1946 | Transley |
| 2,881,472 A | 4/1959 | Wilson |
| 2,938,474 A | 5/1960 | Filler |
| 3,253,420 A | 5/1966 | De George |
| 3,280,590 A | 10/1966 | Larsson |
| 3,436,927 A | 4/1969 | Gruber |
| 3,606,763 A | 9/1971 | Bevins |
| 4,067,318 A * | 1/1978 | Flaith et al. ................ 198/823 |
| 4,195,489 A | 4/1980 | Bernard |
| 4,205,536 A | 6/1980 | Kasahara |
| 4,748,029 A | 5/1988 | Alfred et al. |
| 5,915,527 A * | 6/1999 | Nakamura .................. 198/823 |
| 5,927,478 A * | 7/1999 | Archer ....................... 198/823 |

* cited by examiner

Primary Examiner—William E. Tapolcai
(74) Attorney, Agent, or Firm—Dowrey & Associates (57) ABSTRACT

An apparatus for continuous freezing of liquids and cutting of the resulting frozen material into discrete pieces. A freezing table is provided with a transfer film for transporting liquid to be frozen across the top surface thereof. Side dams are attached to the freezing table such that the lateral edge surfaces of the traveling film extend upwardly against the adjacent side dams forming a trough. A cutting apparatus receives the frozen slab and first cuts the frozen slab into strips, then cuts the strips into discrete pieces. A plurality of circular saw blades, preferably in two counter-rotating rows, are used to cut the slab into strips, and a guillotine cutter is preferably used to cut the strips into discrete pieces.

25 Claims, 5 Drawing Sheets

APPARATUS FOR FREEZING AND CUTTING LIQUIDS

BACKGROUND OF THE INVENTION

1. Field of the Invention

The present invention relates, generally, to an apparatus for freezing liquid food products. More particularly, the invention relates to an apparatus for freezing liquids in a continuous flat slab and subsequently cutting the slab into discrete pieces.

2. Description of the Prior Art

Although the prior art includes various devices and methods for freezing materials, particularly liquids, these devices and methods are believed to have significant limitations and shortcomings. U.S. Pat. No. 2,282,525 to Maguire, for instance, discloses an apparatus for freezing liquid on a belt but there are no side constraints for the liquid. The apparatus is primarily intended to freeze cream, which presumably is sufficiently viscous and solidifies sufficiently fast so that side constraints are not required. It would not work well for less viscous liquids since those liquids would run off the conveyor before freezing.

For freezing other liquids, stationary side constraints, or dams, cannot be used directly against the liquid moving on the conveyor because, as the liquid freezes, it would adhere to the stationary dams. U.S. Pat. No. 3,280,590 to Larsson and U.S. Pat. No. 3,253,420 to De George disclose vertically oriented side belts traveling with the main conveyor to constrain liquid, primarily coffee extract, as it freezes. De George also uses a thin film of ice as a separate layer between the freezing belt and coffee extract.

Another expedient recognized in the prior art is the use of side belts. Side belts, however, add complexity to the freezing apparatus and must be well fitted and synchronized with the main conveyor belt. Furthermore, significant product may remain attached to the side belts at the discharge end and be lost.

As an alternative to side belts, side skirts have been bonded to the continuous main conveyor belt to provide a continuous trough for the liquid. However, use of such side skirts has been troublesome. Product tends to stick to the side skirts upon freezing, even with the use of release coatings, and a significant portion remains with the side skirts at the discharge end, thereby contributing to significant loss. Such product must be cleaned and removed from the continuous belt before the belt returns to the beginning of the freezing line. Furthermore, since the liquid expands upon freezing, significant pressure is exerted against the side skirts which may break the bond or tear the side skirt. U.S. Pat. No. 3,606,763 to Bevins addresses this problem by providing rotating scraper wheels along the side skirts to remove semi-solid coffee extract to keep it from freezing and adhering to the side skirts. This requires optimal placement of the scraper wheels at the point where the liquid becomes a semi solid, which depends on the material and freezing cycle used. Slight variations in the freezing cycle or line speed may require repositioning of the wheels. Other liquids may not exhibit a significant semi-solid state during freezing which is required for the apparatus to work.

All of the freezing systems discussed use continuous belts made of material such as stainless-steel as the main conveyor belt. Though a continuous belt offers the advantage of being reusable, when liquids freeze to it and are removed, a thin film of frozen liquid often remains on the belt. This film can grow during subsequent freezing operations and eventually may cause significant problems when separating the belt from the mass of frozen material. Ideally the belt should be cleaned upon its return and prepared for the next freezing cycle, however, the extra steps and apparatus add cost and complexity to the freezing operation.

The present invention provides an improved liquid freezing and cutting apparatus which overcomes the limitations and shortcomings of the prior art.

BRIEF SUMMARY OF THE INVENTION

The present invention provides an apparatus for freezing and cutting liquids in a continuous process. One portion of the apparatus produces a continuous moving slab of frozen material, and another portion of the apparatus cuts the moving slab into discrete pieces.

The freezing portion of the apparatus includes a freezing table using a transfer film or belt for transporting liquid to be frozen across the top surface thereof. Spaced parallel side dams are attached to the freezing table and extend upwardly beyond the top surface thereof, preferably generally vertically. The side dams are spaced at a distance less than the width of the film or belt to allow the lateral edge surface thereof to extend upwardly against the adjacent side dams to form a trough. A front dam spans the side dams near the liquid input end of the table to constrain the liquid dispensed nearby, the dam being provided with sufficient clearance between its bottom surface or edge and the top of the freezing table to allow passage of the film thereunder, yet prevent seepage or escape of liquid. The front dam has film guide slots which receive the edges of the film to aid in the initial folding of the edge surfaces of the film against the side dams. A screed is provided across the side dams for controlling the thickness of liquid on the film downstream of the screed. In the preferred embodiment the film is a noncontinuous film, preferably polyethylene, that is unwound from a storage roll at the input end of the freezing table and wound onto a take-up roll at the discharge end of the table. In the alternative, a continuous belt may be adapted for use in the system.

The cutting portion of the apparatus is located near the discharge end of the freezing table and includes a plurality of transversely spaced cutting devices for cutting the frozen liquid into longitudinal strips, and a device for cutting the longitudinal strips into discrete pieces. In the preferred embodiment, the transverse cutting devices are circular saw blades disposed in parallel arrangement in two counter-rotating rows, and a guillotine cutter is used downstream of the saw blades to cut the strips into portions.

The features, benefits and objects of this invention will become clear to those skilled in the art by reference to the following description, claims and drawings.

DETAILED DESCRIPTION

Figure 1:
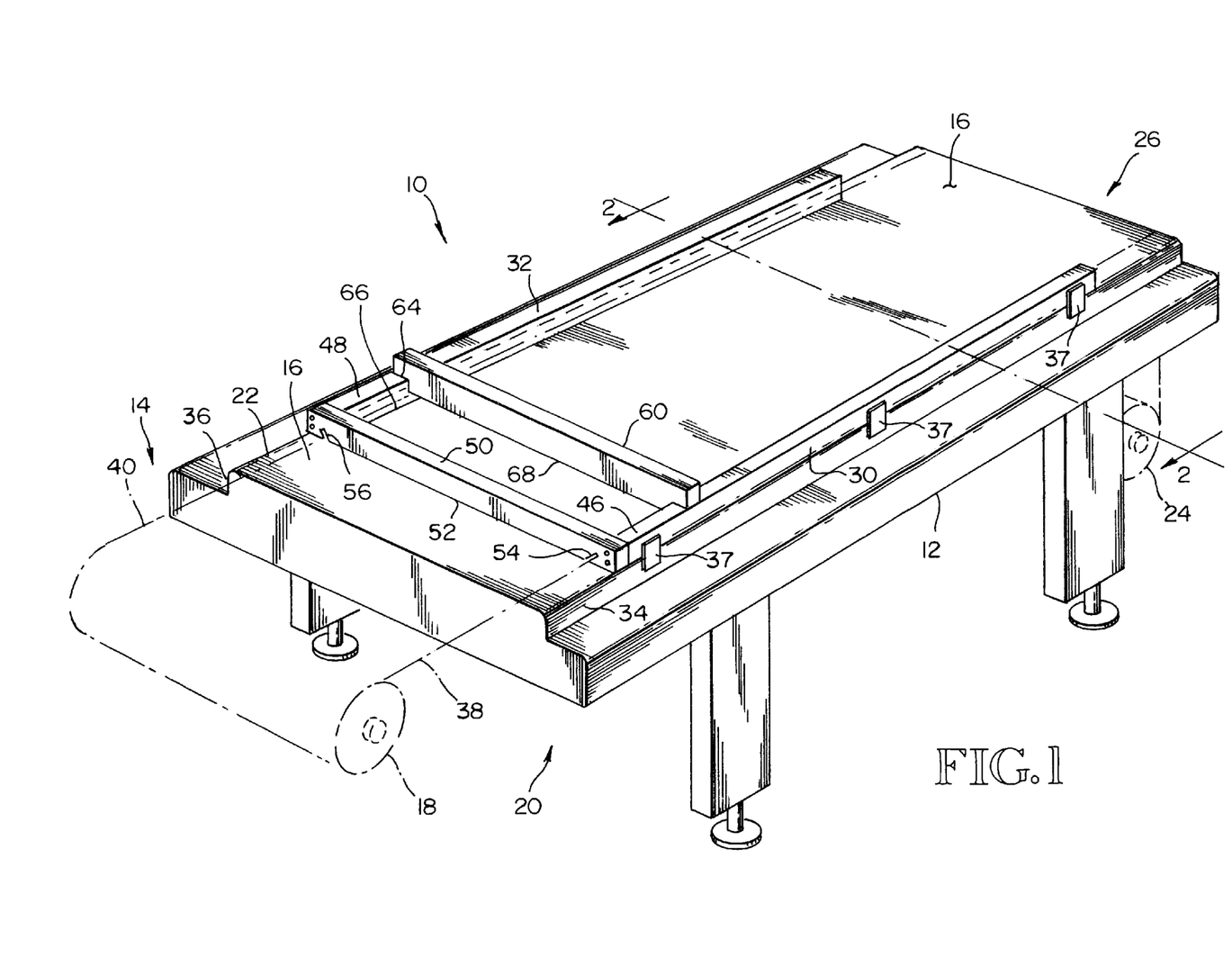
FIG. 1 is a perspective view of the preferred embodiment of the freezing portion of the apparatus.

Referring to FIG. 1, an example of the preferred embodiment of the freezing portion of the apparatus of the present invention is illustrated and generally indicated by the numeral 10. The liquid freezing apparatus 10 comprises a contact-type cooler or freezing table 12, which is well known in the art, with a film transport system 14 used to convey material to be frozen. The table is cooled to a temperature well below the freezing point of the material to be frozen and freezing occurs by thermal conduction through the film in contact with the table. Film 16, typically polyethylene or Teflon® approximately 0.0005 to 0.001 inches thick, is unwound from the storage roll 18 at input end 20 of the freezing table 12, moved across the top 22 of table and wound onto a take-up roll 24 at the output end 26 of the table. Side dams 30 and 32 are fastened to table 12 in spaced parallel relation so that they extend upwardly beyond the top 22 of the table. Preferably, the top 22 of table 12 is wider than film 16 which allows for placement of side dams 30 and 32 on the surface thereof as shown. Alternatively, side dams 30 and 32 could be attached to the sides 34 and 36 of top 22 to allow for maximum width of film 16. Side dams 30 and 32 may be fastened to table 12 directly by any suitable means or by brackets such as shown at 37.

Figures 2, 5:
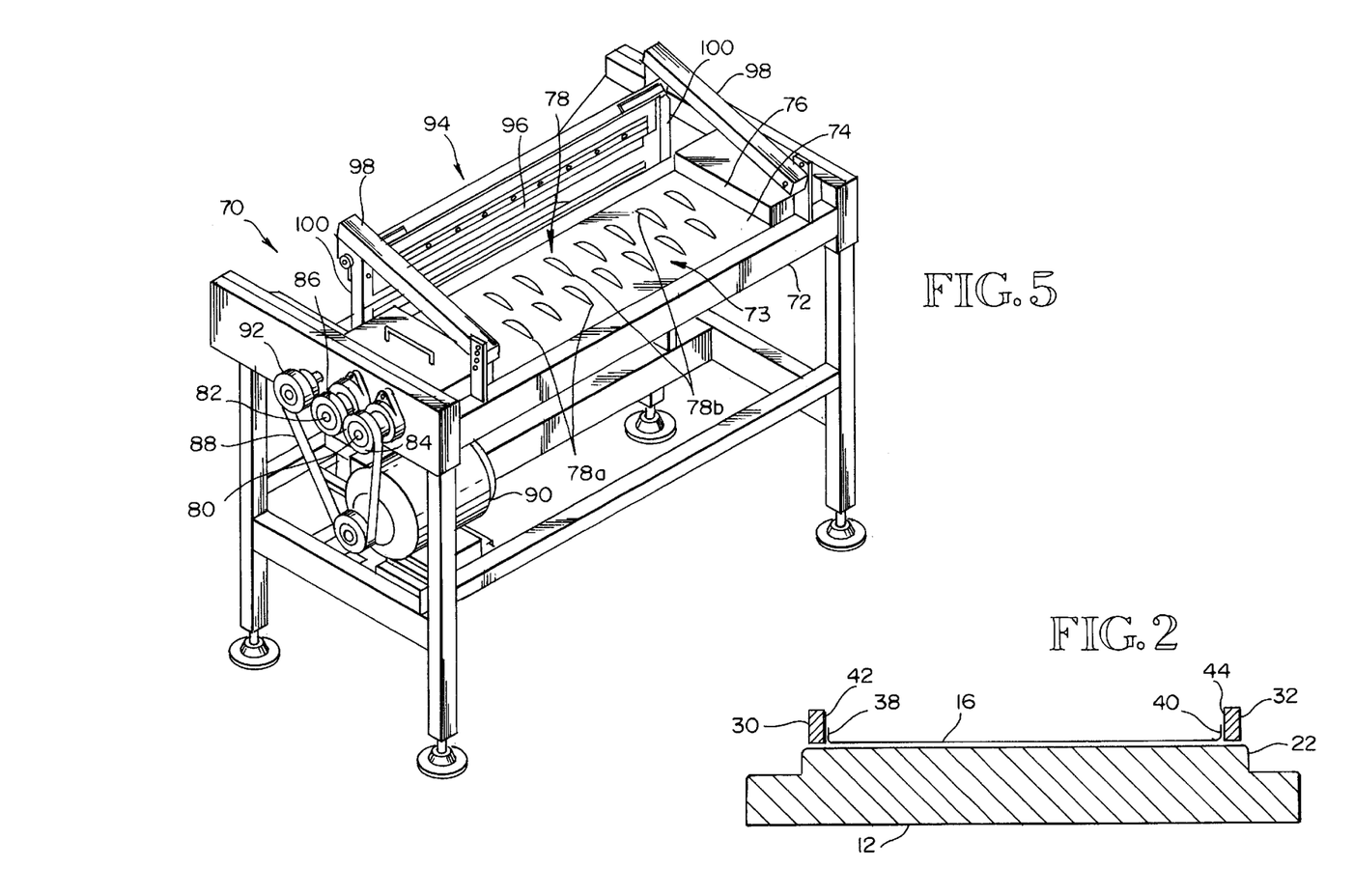
FIG. 2 is a cross-sectional view taken along the line 2—2 in FIG. 1.
FIG. 5 is a perspective view of a preferred embodiment of the cutting portion of the apparatus.

As shown in FIG. 2, film 16 is wider than the transverse distance between side dams 30 and 32, thereby allowing surfaces of the edges 38 and 40 of film 16 to curl, bend, or fold upwardly against the inner faces 42 and 44 of side dams 30 and 32 respectively, thereby forming a continuous trough in which liquid is transported across table 12 and frozen. Preferably, the inner faces 42 and 44 extend generally vertically from the top 22, but they may extend upward at any angle to constrain the liquid on film 16.

Referring again to FIG. 1, front ends 46 and 48 of side dams 30 and 32 respectively have front end dam 50 attached therebetween near the input end 20 of the apparatus to constrain the liquid dispensed just downstream of the dam 50. Front end dam 50 has sufficient clearance between its bottom surface 52 and the surface of table top 22 to allow passage of film 16, yet prevent escape or seepage of liquid. Front end dam 50 has film guide slots 54 and 56 near its opposite ends which receive edges 38 and 40 respectively of film 16 to initiate the folding of the side edge surfaces of film 16 against side dams 30 and 32. Guide slots 54 and 56 may extend from the bottom surface 52 of end dam 50 upwardly and outwardly at an approximate a 45° angle from horizontal and are of sufficient length so as to prevent binding of the edges of the film 16.

A transverse screed 60 extends between side dams 30 and 32 and has rabbets 62 and 64 at its opposite ends which receive dams 30 and 32. Rabbets 62 and 64 have sufficient side clearance to allow the up-turned edges 38 and 40 of film 16 to pass without binding. The corners 66 at the opposite ends of the bottom surface 68 of screed 60 may be radiused to prevent film 16 from being sharply creased or torn as it passes. Screed 60 is spaced downstream from end dam 50 sufficiently far to allow the surfaces adjacent edges 38 and 40 of film 16 to transition from guide slots 54 and 56 in end dam 50 to corners 66 at rabbets 62 and 64, and also to provide sufficient area between the end dam and the screed for liquid dispensed therein to flow properly against screed 60. The edge of the bottom surface 68 of screed is offset a predetermined height from film 16, thereby controlling the thickness, typically ½–¾ inch, of liquid on film 16 downstream of screed 60. Adjustment features, such as screws or shims may be included with screed 60 to adjust its height relative to side dams 30 and 32 to control the thickness of frozen liquid.

In operation, freezer table 12 is chilled to a temperature well below the freezing point of the liquid to be frozen. Film 16 is moved along the top 22 of table 12 at an optimum speed for freezing a particular thickness of liquid. Edges 38 and 40 of film 16 are directed upwardly as they enter slots 54 and 56 and the edge surfaces are bent further upwardly at corners 66 of screed 60. Liquid is dispensed between end dam 50 and screed 60 at a uniform rate so that the full thickness and width of liquid is obtained downstream of screed 60. Downstream of screed 60, pressure from liquid on film 16 maintains the corner shape of the side edges of film 16 against side dams 30 and 32. As film 16 transports liquid along table 12, the liquid freezes into a solid moving slab. At output end 26 of table 12, film 16 is directed downwardly onto output roll 24 and thereby separated from the slab of frozen liquid (not shown). The slab of frozen liquid is directed into the cutting portion of the apparatus described below where it is cut into discrete pieces which are then removed for further processing.

Figure 3:
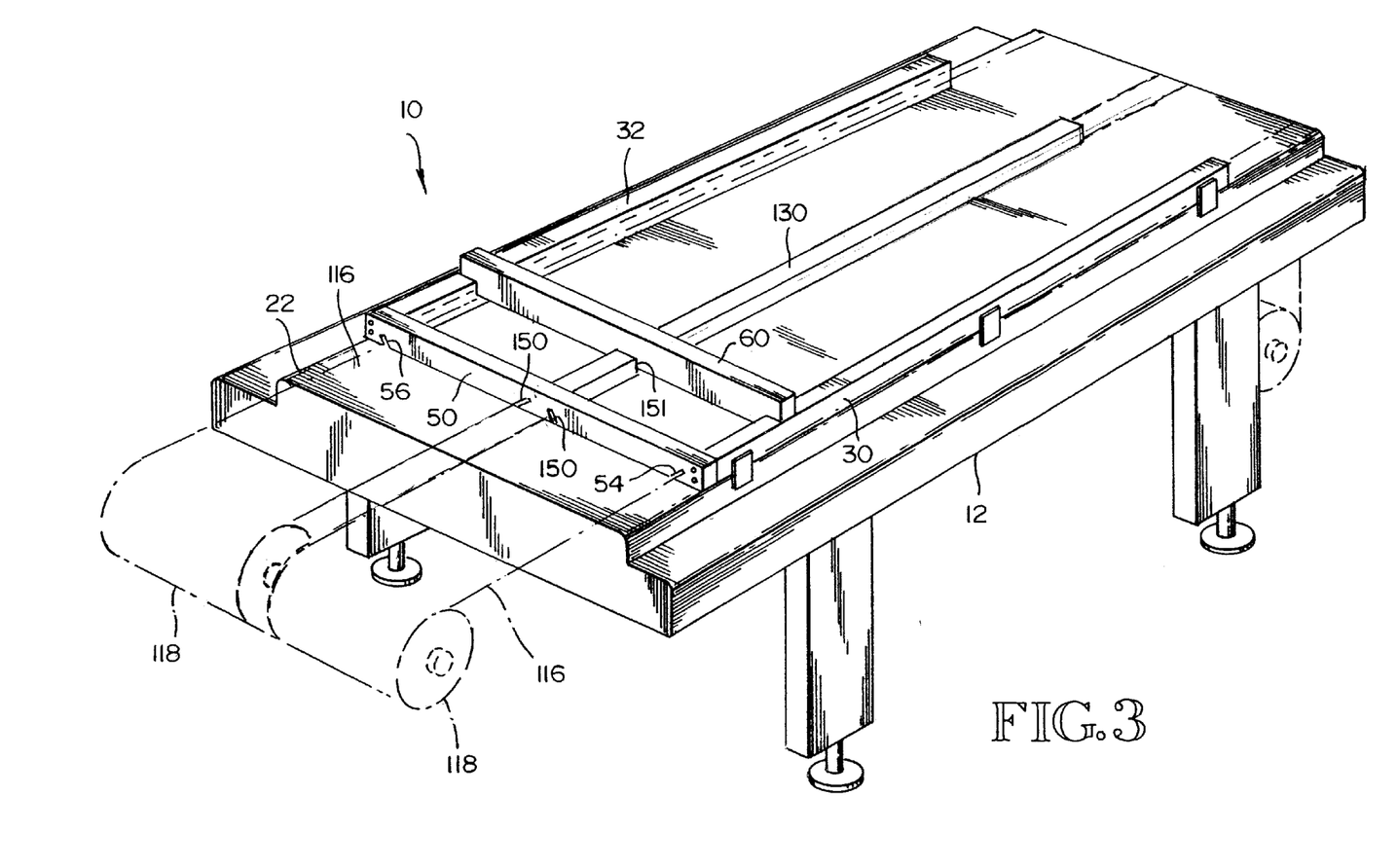
FIG. 3 is a perspective view of an alternate embodiment of the freezing portion of the apparatus having multiple freezing lanes.

Referring to FIG. 3, apparatus 10 may be used to freeze more than one slab of material by providing table 12 with at least one additional central longitudinal dam 130 between side dams 30 and 32 in spaced parallel relation thereto, forming separate lanes of travel. Separate films 116, preferably from separate rolls 118, run along the top 22 of table 12 between each two adjacent dams. End dam 50 has additional slots 150 to accommodate the side edges of films 116. Screed 60 is also appropriately modified to receive the central dam 130 with appropriate clearances and radiused edges on either side of the central dam, as previously described, to permit the bent up edge surfaces of each film 116 to pass without binding. Several slabs of frozen material may be formed on one table in this manner. With this arrangement, each lane of travel could be used for different liquids and/or for different thicknesses of liquid by modification of the screed height. With the use of separate film transport for each lane, the speed of each film can be independently controlled.

Figure 4:
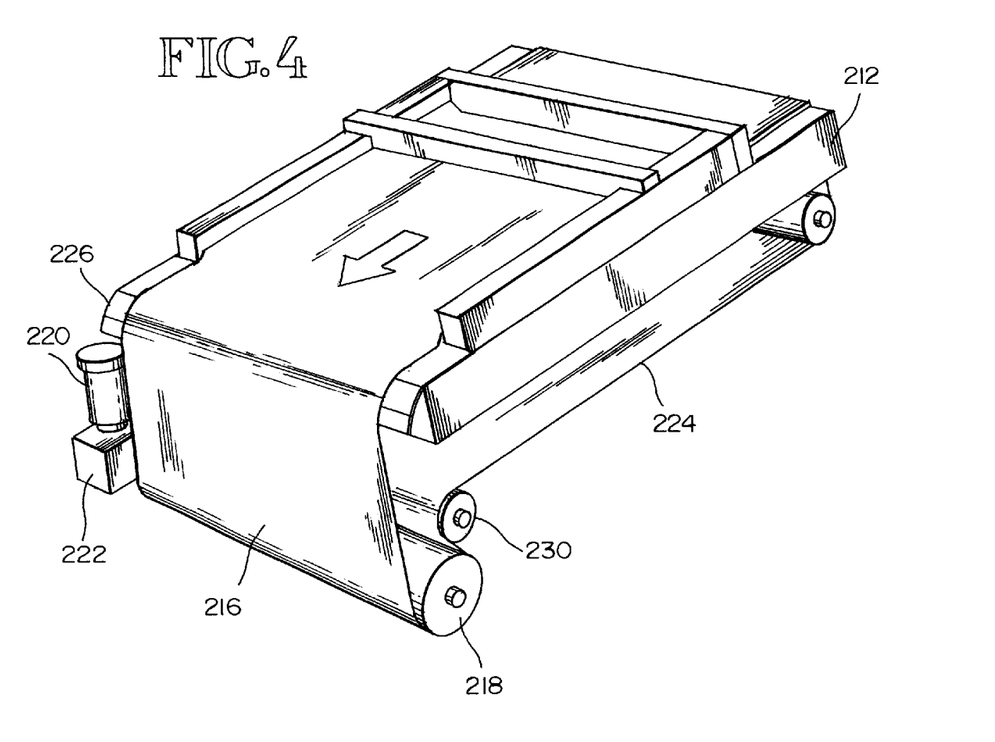
FIG. 4 is a perspective view of an alternate embodiment of the freezing portion of the apparatus using a continuous belt.

Referring to FIG. 4, a continuous belt or continuous film may also be used with freezing table 212 instead of single pass belt or film as previously described. Although other belt materials known to the art may be used, the typical belt used for this embodiment is made of Teflon® coated fiberglass cloth approximately 0.003–0.005 inches thick. Drive roller 218, powered by motor 220 and gearbox 222, drives belt 216 in the direction indicated by the arrow with the lower run 224 of belt 216 being tensioned by the tension roller 230 near drive roller 218. The output end 226 of table 212 is preferably beveled or radiused so that belt 216 is not pulled across a sharp edge and damaged. Belt cleaning apparatus (not shown) may be used to thaw and clean any residual product adhering to belt 216 after the belt is pulled away from the frozen product so that the belt is sufficiently clean upon return to the top of table 212.

Referring to FIGS. 1 and 5, the cutting portion 70 of the apparatus is designed to function in cooperation with the freezer table 12 and will be positioned at the output end 26 of the table 12 or attached thereto to receive the frozen slab or slabs of material from the table surface 22. Alternatively, the cutting portion 70 described below could be structurally incorporated into freezer table 12. In the embodiment illustrated, cutting portion 70 has a support frame 72 which positions deck 74 at a height matching that of the surface of top 22 of freezer table 12. In the embodiment shown, the infeed end 73 of deck 74 receives the frozen slab or slabs of liquid (not shown) from output end 26 of freezer table 12 with guides 76 allowing sufficient clearance for passage of the frozen material. A plurality of cutting blades 78 extend upwardly from deck 74 a sufficient height to cut the full thickness of the associated slab. Cutting blades 78 are preferably circular saw blades having a plurality of teeth around their circumference. Blades 78 are disposed in spaced parallel arrangement, preferably in two counter-rotating rows of equal numbers as shown so that the net pushing or pulling force exerted on the material from the cutting friction is minimized. In the alternative, the blades may be arranged in a single row. Blades 78 are spaced so as to cut indicated by blades 78a, is carried on a shaft 80, and another row of blades, indicated by blades 78b, is carried on a shaft 82. Shafts 80 and 82 extend through support frame 72 and are driven by known means, such as sprockets or pulleys 84 and 86 respectively in operative association with chain or belt 88 which is driven by motor 90. The counter rotation of shafts 80 and 82 can be achieved by passing the chain or belt 88 in a serpentine manner as shown over sprockets or pulleys 84 and 86 with the aid of idler sprocket or pulley 92.

The cutting apparatus 70 also contains a guillotine cutter 94 operating downstream of blades 78. Guillotine cutters are well known and the preferred embodiment for this application includes a shear blade 96 extending between pivot arms 98 which are moved vertically by actuators 100, which may be pneumatic or hydraulic cylinders. The guillotine cutter 94 chops the strips of frozen material formed by the blades 78 into discrete pieces of predetermined length for further processing. Operation of the guillotine cutter is preferably controlled by sensors (not shown) that monitor the position of strips of frozen material beneath it, or the guillotine cutter may be synchronized with the speed of film 16 on table 12.

Deck 74, blades 78, and shear blade 96 are preferably chilled below the melting point of the frozen liquid being cut. This may be accomplished by enclosing the deck and guillotine areas in a shroud, not shown, and chilling the environment inside the shroud. Alternatively separate chilling means, such as cryogenic gas, may be used to chill the components, or the entire cutting portion 70 of the apparatus may be used in a chilled environment.

Figure 6:
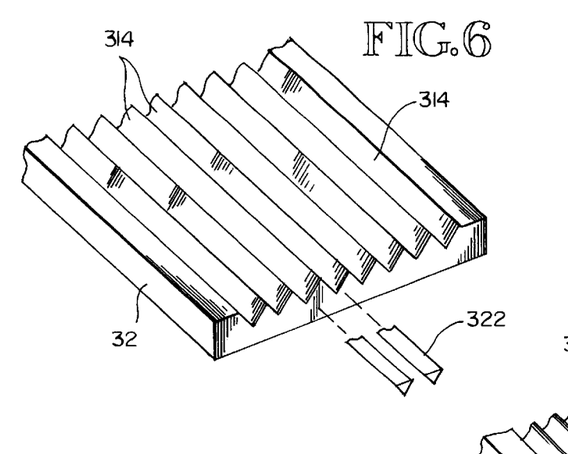
FIG. 6 is a perspective illustration of a portion of an alternate embodiment of the freezing table wherein the table surface has V-shaped grooves.
Figure 7:
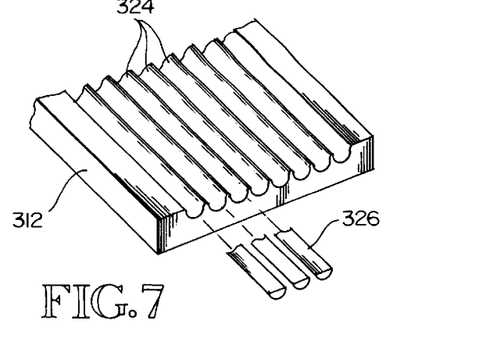
FIG. 7 is a perspective illustration of a portion of an alternate embodiment of the freezing table wherein the table surface has radiused grooves.
Figure 8:
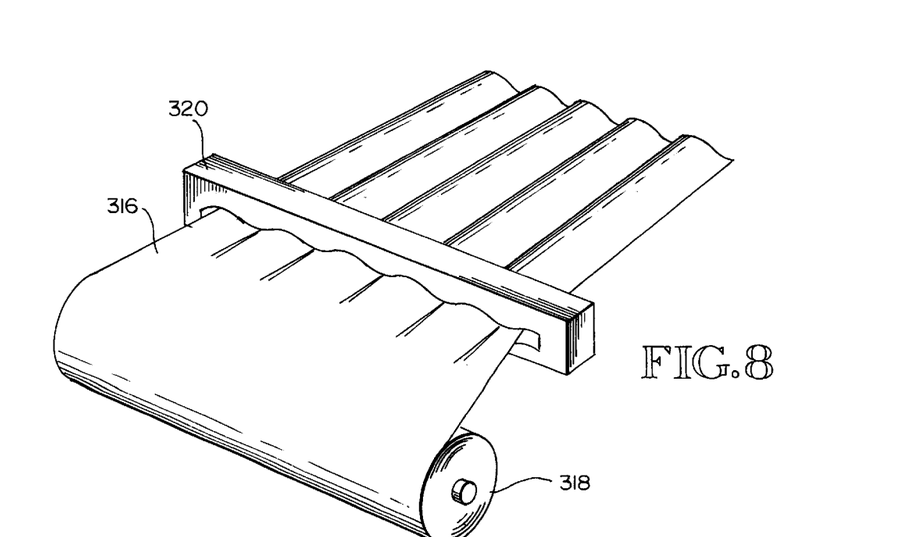
FIG. 8 is a perspective view of a device for pre-forming the film for use with a grooved table.

FIGS. 6–8 illustrate an alternate embodiment of the freezing table which includes a longitudinally grooved surface rather than the previously described flat table surface. The grooves in table 312 may be any desired shape, such as the V-shaped grooves 314 shown in FIG. 6, producing bars 322 with a triangular cross-section as the output, or radiused grooves 324 as shown in FIG. 7, producing bars 326 with a semicircular cross-section. If the liquid level in the grooves 314 or 324 is kept below the top of the grooves, side dams are not necessary since the liquid is constrained laterally by the grooves and the output is individual bars. If side dams are used, the liquid level may be allowed to be higher than the tops of the grooves to produce bars that are connected by a thinner section of material between them which fractures to allow the bars to separate. Since the bars 322 and 326 are already separated longitudinally, the cutting apparatus 70 used with a grooved freezing table 312 need only have a transverse cutting device such as a guillotine cutter 94.

Since, in the embodiment just described, the surface area of the film must match that of the grooved surface of table 312, the width of the film must be greater than the width of the associated table surface 312 to allow the film to be shaped into the grooves. Since the film is thin and pliable and is not constrained at its edges along table 312, the weight of the liquid applied to the film may be sufficient to pull the film downwardly and hold it in the grooves. If necessary, to the initially shape the film to the grooves, liquid could be dispensed first into the center most groove or grooves and subsequently into adjacent grooves, successively pulling the sides of the film inwardly until all the grooves are filled. As shown in FIG. 8, alternatively the film 316 could be mechanically shaped, such as by a die 320, located near the input roll 318, to approximate the contour of the grooves before the film reaches the table 312. With the film preshaped to the grooves, liquid could be dispensed across all grooves simultaneously.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. An apparatus for continuous freezing of liquids, comprising;
    a freezing table having a top surface;
    a movable liquid impervious transfer film for transporting liquid to be frozen across the top surface of the freezing table, and
    a plurality of longitudinally extending parallel side dams mounted on the freezing table and extending upwardly above said top surface,
    said side dams being spaced a distance less than the width of the film,
    said film having lateral edge surfaces extending upwardly against adjacent side dams,
    whereby the film forms a trough between the side dams in which liquid is frozen as it is transported by the film across the top surface of the freezing table.

2. The apparatus of claim 1 wherein said plurality of side dams comprises;
    first and second side dams positioned adjacent the longitudinal side edges of said freezing table and at least one central longitudinal dam located between said first and second side dams and extending parallel thereto,
    said transfer film comprising a plurality of film webs, each said film webs being located between adjacent longitudinal dams,
    said at least one central dam being spaced a distance less than the width of the associated film webs from an adjacent longitudinal dam, and
    each said film webs having lateral edge surfaces extending upwardly against adjacent longitudinal dams.

3. An apparatus for continuous freezing of liquids, comprising;
    a freezing table having a top surface,
    a movable transfer film for transporting liquid to be frozen across the top surface of the freezing table, said freezing table including an infeed end for receiving said moving film, a plurality of longitudinally extending parallel side dams mounted on the freezing table and extending upwardly above said top surface, said side dams being spaced a distance less than the width of the film, said film having lateral edge surfaces extending upwardly against adjacent side dams, a front dam spanning the side dams adjacent said infeed end and spaced above the top surface of the freezing table, the film passing from said infeed end and between the front dam and the top surface of the freezing table in the direction of travel, said front dam preventing reverse flow of liquid deposited on said film downstream thereof in the direction of travel of said film, whereby the film forms a trough between the side dams in which liquid is frozen as it is transported by the film across the top surface of the freezing table.

4. The apparatus of claim 3 wherein the front dam has a bottom surface with upwardly and outwardly extending guide slots for receiving the edge surfaces of the moving film.

5. The apparatus of claim 4 wherein the guide slots are directed at an approximate 45° angle with the bottom surface of the front dam.

6. The apparatus of claim 4 further comprising a screed spanning the side dams and spaced downstream from said front dam, the screed having a bottom spaced above the film to control thickness of liquid downstream thereof, the area between said front dam and said screed defining a delivery area for liquid to be frozen on said table.

7. The apparatus of claim 6 wherein the screed has rabbets at the opposite ends thereof to receive the side dams, said rabbets being spaced from the dam surfaces to permit passage of the upwardly extending edges of said film.

8. The apparatus of claim 3 wherein the film is non continuous, being unwound from a storage roll at the infeed end of the freezing table and wound onto a take-up roll at the opposite end of the freezing table.

9. The apparatus of claim 8 wherein the film is made of polyethylene material.

10. The apparatus of claim 3 wherein the film is a continuous belt.

11. The apparatus of claim 3 wherein the top surface of the table has a plurality of longitudinal grooves for forming bars of frozen material.

12. The apparatus of claim 11 wherein the grooves are V-shaped.

13. The apparatus of claim 11 wherein the grooves are radiused.

14. An apparatus for continuous freezing of liquids, comprising;

a freezing table having a top surface, a movable transfer film for transporting liquid to be frozen across the top surface of the freezing table, a plurality of longitudinally extending parallel side dams mounted on the freezing table and extending upwardly above said top surface, said side dams being spaced a distance less than the width of the film, and said film having lateral edge surfaces extending upwardly against adjacent side dams, whereby the film forms a trough between the side dams in which liquid is frozen as it is transported by the film across the top surface of the freezing table to form a moving frozen slab of said liquid, a cutting apparatus including a plurality of laterally spaced cutting devices positioned for cutting said frozen slab into longitudinal strips, and a device downstream of the cutting devices for cutting the longitudinal strips transversely into discrete pieces.

15. The apparatus of claim 14 wherein said cutting apparatus is mounted on said table.

16. The apparatus of claim 14 wherein the cutting devices comprise saw blades.

17. The apparatus of claim 16 wherein the cutting devices comprise rotating circular saw blades.

18. The apparatus of claim 17 wherein the circular saw blades are disposed in spaced parallel arrangement in two longitudinally spaced rows.

19. The apparatus of claim 18 wherein the two rows of rotating blades are mounted for counter rotation.

20. The apparatus of claim 14 wherein the device for cutting the longitudinal strips into discrete pieces includes a guillotine cutter.

21. An apparatus for the continuous freezing of liquids to form a moving frozen slab of material and cutting of the resulting frozen slab, comprising;

a freezing table having a top surface and a discharge end, a transfer film for transporting liquid to be frozen across the top surface of the freezing table, a plurality of side dams attached to the freezing table, said side dams disposed in laterally space parallel arrangement at a distance less than the width of the film and extending upwardly above the top surface of the freezing table, the film having edge surfaces extending upwardly against adjacent side dams to form a trough for transporting said slab, and a cutting apparatus near said discharge end for cutting said frozen slab, the cutting apparatus having a plurality of rotating circular saw blades spaced for cutting the slab into longitudinal strips and, a guillotine cutter for cutting said longitudinal strips into discrete pieces.

22. In a freezing table having a moving transport web member adapted to receive a liquid to be frozen at a liquid delivery area and transporting the liquid across the surface thereof to form a frozen slab, apparatus for constraining said liquid prior to freezing comprising;

at least one pair of fixed, laterally spaced longitudinal dams extending upwardly from the freezing table to prevent lateral escape of the liquid material prior to freezing, a transverse dam extending between said longitudinal dams and located upstream of said liquid delivery area to prevent upstream flow of the liquid while allowing passage of the web thereunder, a screed located downstream of said transverse dam to control the depth of the liquid to be frozen and the thickness of said slab, the distance between said transverse dam and said screed defining said liquid delivery area, said longitudinal dams being spaced a distance less than the width of the web, whereby the edge surfaces of the moving web extend upwardly against said longitudinal dams to form a trough for transporting said slab.

23. The apparatus of claim 22 wherein said transverse dam includes guides to initiate upward bending of the edge surfaces of the moving web to form said trough.

24. A method for freezing a liquid to form a moving frozen slab of material comprising the steps of;

moving a transport web across a freezing table, delivering a liquid to be frozen onto the surface of the moving web at a delivery point, damming the web to prevent reverse flow of the liquid with a fixed transversed dam upstream of the delivery point, screeding the liquid material to control the thickness of the frozen slab, damming the web with fixed longitudinal dams to prevent lateral escape of liquid, and directing the lateral edge surfaces of the web upwardly against the longitudinal dams to form a trough therebetween for transport of the frozen slab.

25. A method for freezing a liquid to form a moving frozen slab of material comprising the steps of;

moving a liquid impervious transport web across a freezing table, delivering a liquid to be frozen onto the surface of the moving web at a delivery point, screeding the liquid material to control the thickness of the frozen slab, damming the web with longitudinal dams to prevent lateral escape of liquid, and directing the lateral edge surfaces of the web upwardly against the longitudinal dams to from a trough therebetween for transport of the frozen slab.

* * * * *